United States Patent [19]

Hestad

[11] Patent Number: 4,588,865
[45] Date of Patent: May 13, 1986

[54] MUSIC ON HOLD FOR KEY SYSTEMS

[75] Inventor: Alfred M. Hestad, Phoenix, Ariz.

[73] Assignee: Vodavi Technology Corporation, Scottsdale, Ariz.

[21] Appl. No.: 630,059

[22] Filed: Jul. 12, 1984

[51] Int. Cl.$^4$ .............................................. H04M 3/32
[52] U.S. Cl. .................................................... 179/99 H
[58] Field of Search ................ 179/99 H, 99 R, 99 M, 179/81 R, 18 AD

[56] References Cited

U.S. PATENT DOCUMENTS

| | | | |
|---|---|---|---|
| 4,011,413 | 3/1977 | Phillips | 179/81 R |
| 4,066,847 | 1/1978 | Giordano | 179/99 |
| 4,243,844 | 1/1981 | Waldman | 179/81 R |
| 4,365,117 | 12/1982 | Curtis | 179/99 H |
| 4,376,875 | 3/1983 | Beirne | 179/18 B |
| 4,408,102 | 10/1983 | Lumpkin | 179/99 H |
| 4,429,187 | 1/1984 | Butcher | 179/81 R |
| 4,445,003 | 4/1984 | Alderman | 179/81 R |

Primary Examiner—James L. Dwyer
Attorney, Agent, or Firm—Ratner & Prestia

[57] ABSTRACT

A music on hold system is provided for key telephone systems having key stations, central office lines, and a muting relay for load resistance termination of the central office lines when they are on hold. A music source provides a music signal which is applied to the muting relay. When the telephone system controller receives a hold command from a key station, it generates a hold signal and applies the hold signal to the muting relay. In response to the hold signal, the muting relay applies the music signal to the central office line. Before being applied to the muting relay, the music signal is conditioned by passage through a gain control, a high frequency cut off filter, an amplifier, and a DC level shifter.

4 Claims, 2 Drawing Figures

MUSIC ON HOLD FOR KEY SYSTEMS

BACKGROUND OF THE INVENTION

A. Field of the Invention

This invention relates to the field of key telephone systems and in particular to providing music to lines of such systems which are put on hold.

B. Background Art

A typical key telephone system may have 12 key stations each station being a telephone of a conventional type, 6 central office lines each capable of handling either an incoming call, an outgoing call, or an intercom call, a Key Service Unit (KSU) for connecting key stations and central office lines as required by controlling a switching matrix, and trunk lines connecting the central office lines of the office telephone system to the external communication network.

The KSU in these systems typically include a microprocessor which controls the overall operation of the system including the switching matrix and various relays within the system. The switching matrix, under the control of the KSU, must have the capability of connecting each of the key stations to each of the central office lines in order to permit all key stations to receive incoming calls on any of the central office lines and conversely to allow all key stations to use any of the central office lines to make an outgoing call.

The central office lines are in turn connected to the trunk lines by a central office interface. Within the central office interface there is a muting relay, sometimes called a "C" relay, for each central office line. One purpose of this muting relay is reducing wear on a pulse relay with the KSU by switching in an RC network. Another purpose is to switch a shunt resistance across a transformer within the interface to minimize transformer spikes. An additional purpose is to switch a load resistor termination onto the central office line, and thereby onto the trunk line, when an outside call is put on hold. Hence, the name muting relay.

It is often desirable, when a call is put on hold, to supply music to the central office line on which the call is routed rather than muting the line. Music supplied to the central office line is transmitted through the trunk line to the party who is put on hold. This has been accomplished several different ways.

One way has been to increase the size of the switching matrix. This has required supplying an extra line to carry music in the matrix. This line, like the lines of all the key stations, may be coupled to any of the central office lines by the switching matrix, thereby allowing the music signal to be applied to any of the central office lines which may be in use for an incoming call. Such an enlargement of the matrix, of course, has increased the complexity and cost of the matrix as well as the complexity of the coding scheme which was required for the microprocessor to control the matrix.

Another method has been to supply music to one of the existing key station lines. This method used the already existing architecture and required no expansion of the matrix and no adjustment to, or increase in, the complexity of the codes by which the microprocessor of the KSU controlled the matrix. However, the disadvantage was that the system handled one less key station because the line which was used to carry the music signal was no longer available for connection to a key station.

Other prior alternatives have been additional relays or switches in the interface between the central office lines and the external trunk lines. A line carrying a music signal could thereby be selectively coupled and decoupled to the interface for a given trunk line whenever the call on that trunk line was put on hold. This eliminated the need to expand the matrix or to decrease the capacity of the overall system. However, it greatly increased the cost of the system since an individual relay would have to be provided for each of the separate central office lines. In addition, control lines and control circuitry for each of these additional relays had to be provided as well as additional microprocessor programming to control the relays.

It is, therefore, an object of the invention to provide music on hold without enlarging the size of the switching matrix between key station lines and central office lines or decreasing the number of key stations which the matrix may switch.

An additional object of the invention is to provide music on hold without providing additional switching relays or switching relay control circuitry.

SUMMARY

A music on hold system is provided for key telephone systems having key stations, central office lines, and a muting relay for load resistance termination of the central office lines when they are on hold. A music source provides a music signal which is applied to the muting relay. When the telephone system controller receives a hold command from a key station, it generates a hold signal and applies the hold signal to the muting relay. In response to the hold signal, the muting relay applies the music signal to the central office line.

DETAILED DESCRIPTION OF THE INVENTION

Figure 1:
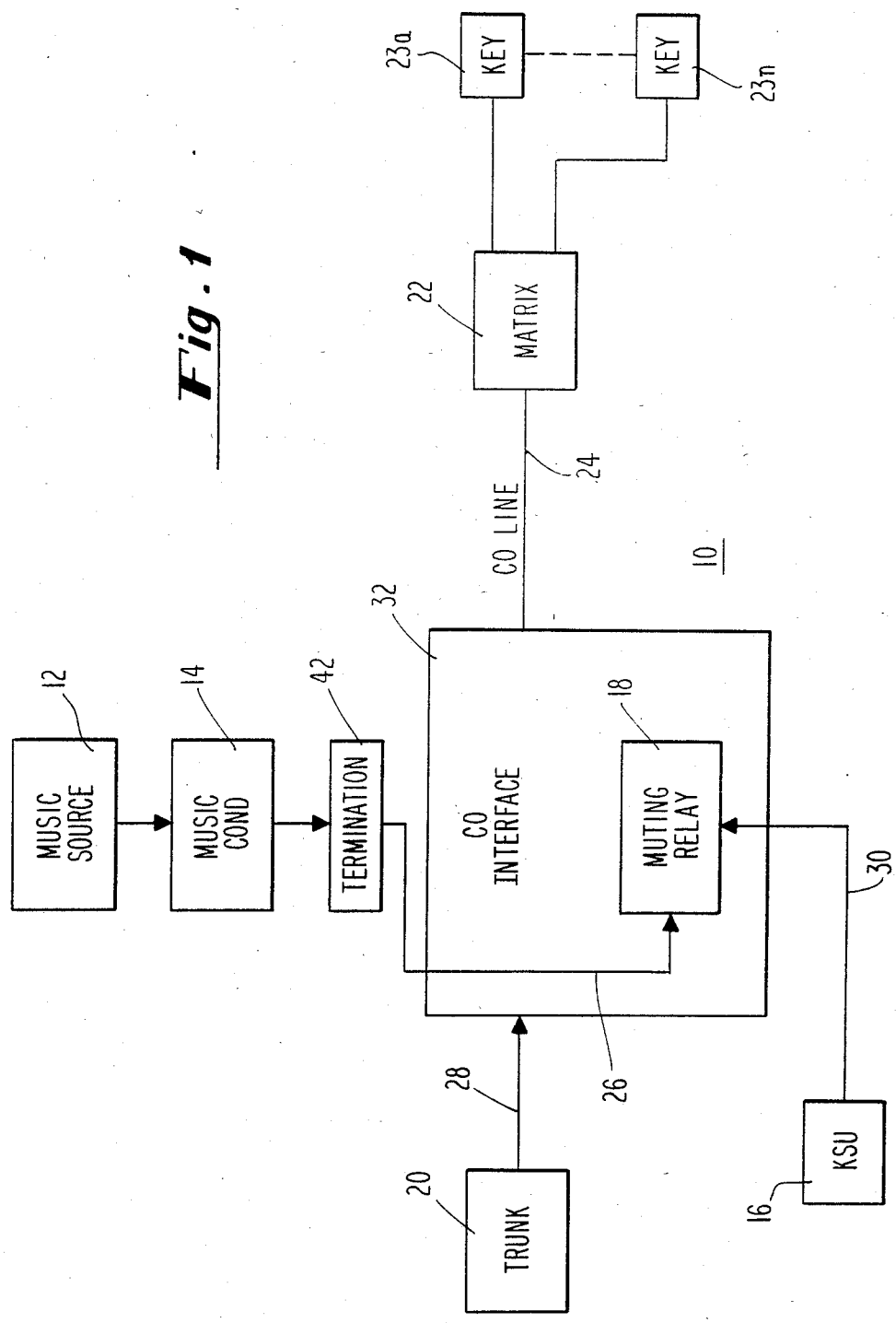
FIG. 1 shows a block diagram of the music on hold system of the present system.

FIG. 1 shows the music on hold system 10 of the present invention. System 10 comprises an external audio music source 12, a signal conditioner 14, a Key Service Unit (KSU) 16, a central office interface 32 which includes a muting relay 18, a switching matrix 22 which may switch any one of a plurality of key stations 23a–n onto central office line 24, and a trunk 20 which communicates with central office line 24 through interface 32. Music on hold system 10 may be part of an office telephone system and trunk 20 may couple the telephone system with an external communication network.

Trunk 20 is coupled by line 28 to central office interface 32. Central office interface 32 contains muting relay 18 and couples trunk line 28 to central office line 24. Central office line 24 is coupled to one of the key stations 23a–n by matrix 22.

In music on hold system 10, music source 12 supplies an audio music signal which is conditioned by signal conditioner 14 and applied by line 26 to a contact in muting relay 18. Muting relay 18 is an integral component of central office interface 32 which is already present in conventional central office interfaces and is required for the normal proper operation of central office interface 32.

When KSU 16 determines that the call on central office line 24 is put on hold by reading a hold command from the key stations coupled to line 24 by matrix 22, a hold signal is applied to muting relay 18 by line 30. The hold signal from KSU 16 causes muting relay 18 to patch the audio music signal which is on line 26 into central office line 24 within interface 32. The music signal is thereby applied to trunk 20 and through trunk 20 to the party put on hold.

Within a conventional central office interface 32, the conventional muting relay 18 serves several purposes, one of which is to provide a resistive load termination at a predetermined potential to central office line 24 when a line is put on hold by switching a resistive load onto line 24. Holding line 24 at a predetermined potential, rather than allowing spurious noise signals to be propogated on the line, causes trunk line 20 to be muted rather than noisy. More particularly, central office line 24 is put on hold when KSU 16 sends a signal by way of line 30 which causes muting relay 18 to switch in a termination source having a resistive load which is coupled by way of line 26 to a music signal source. Thus, termination of line 24 is provided wherein the termination is coupled to a source of music.

Music source 12 may be a radio, a cassette player, or any conventional music source. The only practical restriction on music source 12 is that the output level must be within a certain range or that it be adjustable to be brought into such a range.

It is known to those skilled in the art that matrix 22 and interface 32 are conventionally housed within KSU 16. Furthermore, it is known that KSU 16 is coupled to all elements of the phone system which it controls although some interconnections may be omitted to simplify the drawings.

Figure 2:
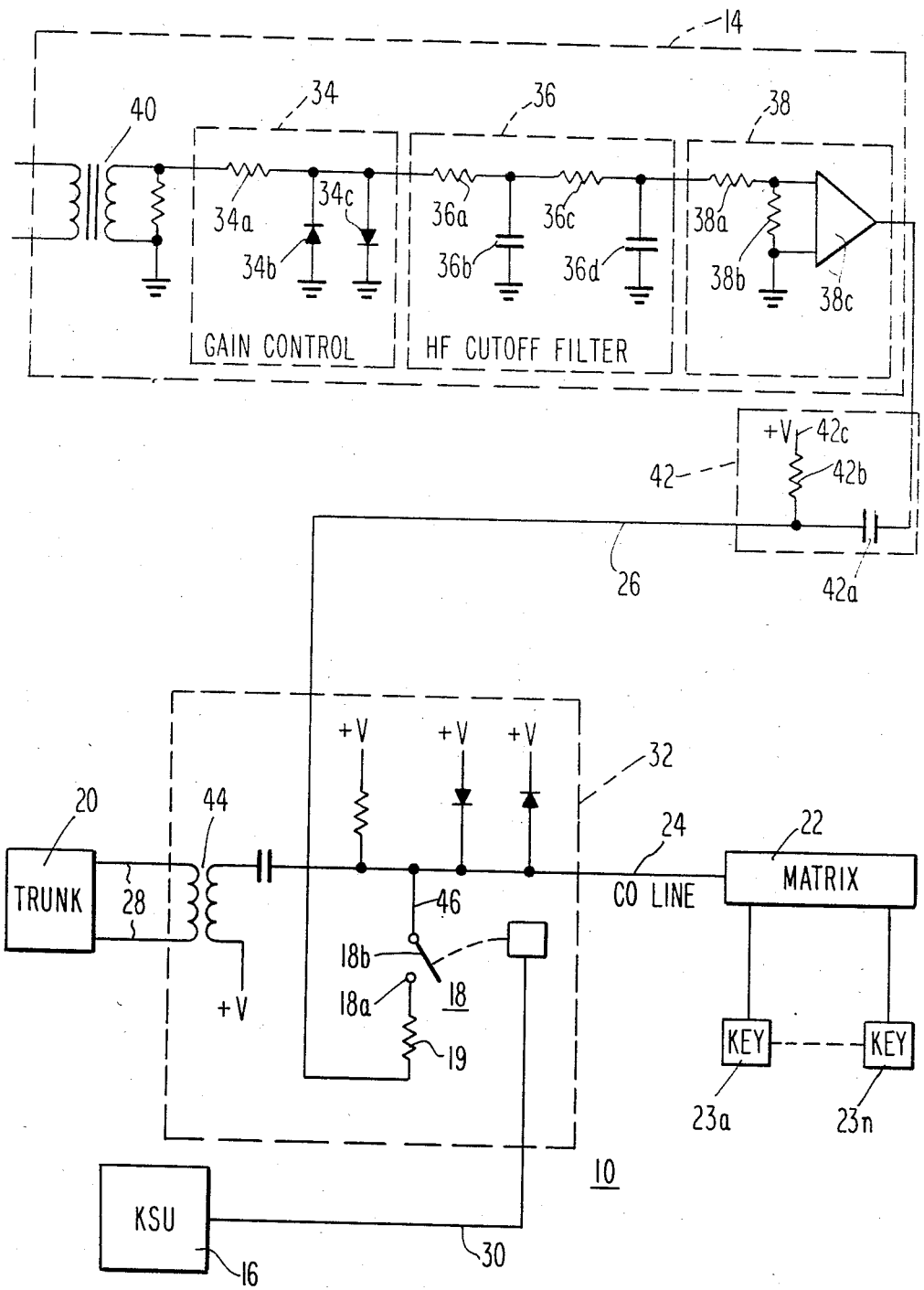
FIG. 2 shows a more detailed diagram of the music on hold system of FIG. 1.

FIG. 2 shows a more detailed representation of music on hold system 10. Signal conditioning means 14 includes a transformer 40, a gain control 34, a high frequency cut off filter 36, and a DC level shifter 42. Transformer 40 is an isolation transformer which is coupled to music source 12 and which blocks any high voltage which may be applied to signal conditioner 14. This is necessary to prevent high voltage levels from being applied to trunk 20 in accordance with Federal Communications Commission requirements. Transformer 40 may be used to do some impedence matching but the impedance matching is not critical. Since most conventional music sources are designed to drive an 8 ohm load, a typical transformer 40 might match 8 ohms to 600 ohms.

Gain control 34 comprises a resistor 34a and diodes 34b,c connected to ground in opposite directions. Diodes 34b,c of gain control 34 clip any swings of the input music signal which are too large in either direction. Thus the upper limit on the magnitude of the music signal of music source 12 should be chosen so as to avoid such clipping.

High frequency cut off filter 36 has its poles at approximately 3,400 Hertz and comprises a first stage with resistor 36a and capacitor 36b, and a second stage with a resistor 36c and a capacitor 36d. Cut off filter 36 prevents any high frequency harmonics from being injected into trunk 20 in accordance with FCC requirements. These high frequency harmonics may be present as a result of clipping within gain control 34.

Amplifier 38 is a conventional operational amplifier 38c with its input resistors 38a,b. Amplifier 38 provides the amplitude required to drive the music signal at a level adequate for trunk 20. Thus the lower limit on the magnitude of the music signal from music source 12 should be chosen in accordance with the gain of amplifier 38. Level shifter and termination 42 comprise a blocking capacitor 42a to block whatever DC level may be present at the output of amplifier 38. Further, a pull up resistor 42b, coupled between line 26 and a positive voltage source 42c, provides a desired DC level through resistsor 19 to a fixed contact 18a of relay 18.

The output of signal conditioner 14 is the music signal which is applied to central office interface 32 by line 26. It should be noted that a portion of central office interface 32 which detects incoming calls and signals KSU 16 to produce a ring is not relevant to the invention of system 10, and therefore, is not shown. KSU 16 polls key stations 23a–n and when it receives a hold command from the key station, coupled to central office line 24, it signals muting relay 18 by line 30 that central office line 24 is to be put on hold. In response to this hold signal, a movable contact 18b of relay 18 engages the fixed contact 18a thereby to couple central office line 24 to line 26 which carries the music signal from signal conditioner 14. This is accomplished by coupling music signal line 26 with line segment 46 permanently coupled to line 24.

In a conventional central office interface this hold signal from KSU 16 would result in just a load resistor 19 and voltage source termination being switched onto central office line 24 by muting relay 18 using the same line segment 36. In system 10, however, muting relay 18 is additionally effective to couple the music signal from line 26 into line 24. Resistors 19 and 42b, along with voltage 42c, form a termination source which, together with the music signal, are coupled to line 24 by way of contacts 18a,b in response to the hold signal from KSU 16.

Line 24 is coupled by transformer 44 to trunk 20, thereby causing the music signal of line 26 to be transmitted to trunk 20 and thereby to the party on hold. Thus, the party on hold hears music from music source 12 rather than silence when muting relay 18 responds to the hold signal from KSU 16.

A command that central office line 24 be put on hold is generated at one of the key stations 23a–n and communicated to KSU 16. During this music on hold period, KSU 16 decouples central office line 24 from the key station which requested that central office line 24 be put on hold. This prevents the music signal from being transmitted to the requesting key station.

Although music on hold system 10 is described with respect to a single central office line 24, it should be noted that line 26 may be coupled to the muting relay of each of a plurality of central office interfaces simultaneously thereby applying a music signal to a plurality of central office lines simultaneously.

| Reference Numeral | Type |
| --- | --- |
| 18 | Aromat DS-Z-M-OC 24V |
| 34b,c | IN4148 (2X) |
| 38c | LM 386 |

I claim:

1. A music on hold system for a key telephone system having a plurality of key stations each key station having a hold command, at least one central office line coupled between a key station and a trunk line comprising:

a termination source having a resistive load, music source means for providing a music signal, filter means for receiving the music signal and removing the high frequency harmonics from the music signal while passing a substantial portion of the audio range, means for providing a DC level shift to the music signal separate from the filter means, means for applying the filtered level shifted music signal to the termination source, a muting relay coupled to the central office line for termination of the central office line to said termination source during hold, control means coupled to the key stations for polling the key stations and receiving a hold command from an originating key station and for generating a hold signal in response thereto, means for decoupling the central office line from the originating key station in response to the hold signal, and means for applying the hold signal to the muting relay means whereby the muting relay applies the filtered shifted music signal to the trunk line through the central office line in response to the hold signal.

2. The system of claim 1 in which the termination source comprises a pull up resistor connected in series with an additional resistor, a potential source coupled to the free end of said pull up resistor and the free end of the additional resistor coupled to the muting relay.

3. The system of claim 2 in which the music source means is coupled to the junction of said resistors.

4. The music on hold system of claim 1 wherein the system further comprises an isolation transformer, a gain control and an amplifier.

* * * * *